United States Patent [19]

Bischofberger et al.

[11] 4,343,972
[45] Aug. 10, 1982

[54] HYDRAULIC DRIVE FOR ELECTRICAL SWITCHES

[75] Inventors: Walter Bischofberger, Niederweningen; Norbert Zeller, Ennetbaden, both of Switzerland

[73] Assignee: BBC Brown, Boveri & Company, Ltd., Baden, Switzerland

[21] Appl. No.: 201,523

[22] Filed: Oct. 28, 1980

[30] Foreign Application Priority Data

Nov. 1, 1979 [CH] Switzerland ............... 9799/79

[51] Int. Cl.³ .................................. H01H 35/38
[52] U.S. Cl. ........................... 200/81 R; 200/82 R; 91/417 R; 91/459; 91/461
[58] Field of Search ............. 200/148 A, 148 F, 82 R, 200/82 B, 81 R, 153 SC; 91/417 R, 459, 461; 137/625.64, 625.66

[56] References Cited

U.S. PATENT DOCUMENTS 3,832,502 8/1974 Grieger .................. 200/82 B
3,999,464 12/1976 Grieger .................. 91/417 R

FOREIGN PATENT DOCUMENTS

2047822 6/1978 Fed. Rep. of Germany .

Primary Examiner—Gerald P. Tolin
Attorney, Agent, or Firm—Burns, Doane, Swecker & Mathis

[57] ABSTRACT

A hydraulic drive for an electrical switch is disclosed including magnetically operated control signal organs for initiating closing and opening of the electrical switch which is hydraulically driven by a drive with a differential piston moving in a drive cylinder. A switch-over control valve is employed for selectively pressurizing and depressurizing a larger end face of the piston. In order to prevent "pumping" of the switch by such a switch drive system according to the present invention, the control signal organ which is opened in connection with the initiation of the closing of the switch is manipulated hydraulically at approximately the same time as the pressurization by the switch-over control valve of the larger piston end face of the differential piston of the drive commences. The hydraulic manipulation shifts the control signal organ back into a closed position. This arrangement permits at most only one on-off switching cycle to occur, and thus "pumping" of the switch is prevented.

11 Claims, 9 Drawing Figures

HYDRAULIC DRIVE FOR ELECTRICAL SWITCHES

BACKGROUND AND SUMMARY OF THE PRESENT INVENTION

The present invention relates to an hydraulic drive for electric switches. More particularly the present invention relates to an arrangement for preventing pumping of hydraulically actuated electric switches.

In general it is known in hydraulic drives for switches to use drive cylinders which operate the switch when subjected to pressure from, e.g., high-pressure oil. With this arrangement an hydraulic reservoir supplies the energy required for the switching. The interior of the hydraulic reservoir is divided into an oil space and a nitrogen space by, e.g., a moving piston or a membrane with the nitrogen acting as an energy storage medium.

Magnetic valves are often used as control organs for activating the hydraulic drive for switching the switch on and off. These magnetic valves convert electrical control signals to corresponding hydraulic control signals. Following the actuation, the magnetic valves are returned to the closed position by springs included with the valves. In addition, it is known to connect a larger piston face of a differential piston of the drive for the switch, which piston moves back and forth within a drive cylinder, with the high-pressure or low-pressure side of the hydraulic system. The connection of the high or low pressure side of the hydraulic system to the cylinder is made of a selector valve. The oil that is not under high pressure is contained in an oil container.

It is disclosed in the BBC Handbook for Planning, Construction, and Installation of Switching Systems, 3rd Revised Edition, 1964, p. 393, that it is desirable to include an arrangement for pumping-prevention in order to avoid pumping of the switch or the drive. In particular if a heavy-duty switch, subsequent to an "on" control signal, immediately switches off automatically, e.g., under the influence of a protective device (circuit breaker), the heavy-duty switch will not switch back on again even if the control switch is maintained in the "on" position. Such pumping-prevention is relatively simply and easily achieved purely electrically, by a pumping-prevention relay such as a snap-action protector mentioned on p. 482, Ibid. This arrangement works regardless of the design of the drive, assuming that the primary command signal is only actuated electrically. The pumping-prevention relay can be installed completely in the drive of the heavy-duty switch, as appears on p. 482, Ibid., e.g. in the form of a sliding pawl.

Further, with a switch as disclosed in, e.g., German AS No. 2,047,822, the pumping-prevention means can be installed at least partially in the switch drive, especially if, e.g., a hand control or emergency hand control is employed with which one has a purely mechanical, manual actuator (e.g., press bar) on the primary control signal organ.

With the electrical switch disclosed in German AS No. 2,047,822, after the circuit is switched on, the electrical control signal of the on-switching control signal organ (a magnetic coil) is suspended by an auxiliary cylinder. However, when there is an unwanted prolongation of the hydraulic on signal, e.g., caused by a control valve closing too slowly, the hydraulic on control signal persists for so long a period of time that if a control signal for "off" is established concurrently, the switch repeatedly switches on and off.

Thus, it is an object of the present invention among others to arrange an hydraulic drive for switches such that when concurrent actuation of command signal organs to move the switch both on and off occurs, only one off-switching occurs.

A further object of the present invention is to provide an arrangement in which only one on-and-off switching cycle results if the off-switching control signal is triggered soon after the on-switching control signal.

These objects and others are achieved by the present invention by providing an on-switching control signal which is hydraulically triggered independently of any other control signal triggering. The on-switching control signal is triggered to subject a larger end face of a differential piston of a drive cylinder of the electrical switch to pressure as soon as the switching on of the electrical switch has been set in motion hydraulically. With this arrangement, the on-switching control signal is triggered when an electrically triggered and thus hydraulically open control signal organ for switching on the switch is again closed. Even with emergency hand actuation of the control signal organ for switching on the switch, and concurrent or shortly subsequent switching off of the switch, pumping of the switch is rendered virtually impossible by the present invention.

It is also preferred for the hydraulic drive of the present invention to be arranged such that the length of conduits for hydraulic medium between the differential piston of the drive cylinder and a first resetting means of the control signal organ for turning on the switch can be reduced. It is also preferred to make use of the pressure buildup at the larger piston end face of the differential piston of the drive cylinder in the most direct possible way, by simultaneously pressurizing the first resetting means for hydraulicly closing the control signal organ for switching on the switch, and thereby further shorten the triggering time of the on-switching control signal.

BRIEF DESCRIPTION OF THE DRAWING FIGURES

A preferred embodiment of the present invention will be described with reference to the attached drawing figures wherein like members bear like reference numerals and wherein.

DETAILED DESCRIPTION OF THE PREFERRED EMBODIMENT

Figure 1:
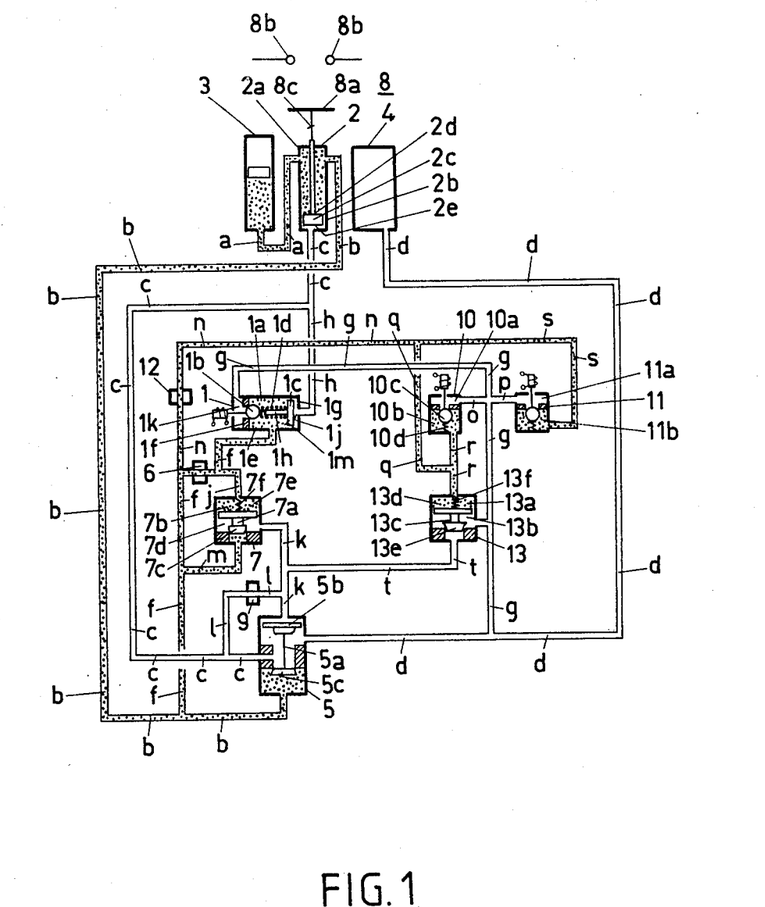
FIG. 1 is a schematic view of an hydraulic system and an electrical switch in an "off" setting.

With reference to FIG. 1, a control signal organ 1 is arranged for switching on an electrical switch 8. A drive cylinder 2 is provided with a piston 2c to actuate the electrical switch 8 with the drive cylinder 2 being supplied with fluid from a hydraulic reservoir 3. An hydraulic medium container 4 is also associated the system.

A switch-over control valve 5 is provided for switching-over the switch 8 from the "off" to the "on" position and from the "on" position to the "off" position. The hydraulic reservoir 3 is connected via a first pipe a to a portion 2a of drive cylinder 2. The portion 2a is in turn connected to the switch-over control valve 5 via a second pipe b. A third pipe c connects the switch-over control valve 5 to another portion 2b of the drive cylinder 2. A fourth pipe d connects the switch-over control valve 5 to the hydraulic medium container 4.

The control signal organ 1 for switching on the switch 8 includes a central space 1a which is continuously connected to portion 2a of the drive cylinder 2, via the second pipe b and a fifth pipe f in which a first restrictive orifice 6 is arranged. The central space 1a is also selectively connected to the hydraulic medium container 4 via a switchable control signal part for switching on the switch 8. The switchable control signal part is in the form of a ball valve 1b which, in the open position of the ball valve 1b, connects the space 1a to the hydraulic medium container 4 via a sixth pipe g and the fourth pipe d, or, in the closed position of the ball valve 1b, disconnects the space 1a from the container 4.

The central space 1a is bounded by a cylinder 1e in which a first resetting means in the form of a piston 1c is guided in reciprocating motion in an axial direction of the cylinder 1e and is sealed against passage of the pressure medium around the piston 1c. The cylinder 1e has a first end wall 1f which includes an orifice which is opened and closed by the ball valve 1b. The other end of the cylinder 1e is partially closed by a second end wall 1g to which a seventh pipe h is attached. The seventh pipe h is connected to the switch-over control valve 5 through the third pipe c.

The ball valve 1b is disposed in the central space 1a such that a second resetting means is in the form of a repelling spring 1d is mounted between the ball valve 1b and the first resetting means or piston 1c. The spring 1d urges the ball valve 1b constantly toward a closed position against the first end wall 1f and also urges the sliding piston 1c toward a rest position against the second end wall 1g. The piston 1c also has a cylindrical stem 1h along which the repelling spring 1d is guided. The length of the stem 1h is selected such that the ball valve 1b in the open position can be pushed by the stem 1h into the closed position against the orifice in the first end wall 1f of cylinder 1e when the piston 1c is subjected to pressure through the seventh pipe h against the action of the repelling spring 1d.

The connection between the second portion 2b of the drive cylinder 2 and the control signal organ 1 for switching on the switch 8, which connection comprises part of the third pipe c along with the seventh pipe h, is made as short as possible. This connection serves to pressurize both a larger piston end face 2e of the differential piston 2c of the switch drive cylinder 2 and a piston end face 1j of the piston 1c, which end face 1j faces away from the repelling spring 1d. Alternatively, to minimize the length of this connection, the control signal organ 1 for switching on the switch 8 may be mounted directly on the second portion 2b of the drive cylinder 2.

An on-switching amplification valve 7 is interposed between the control signal organ 1 for switching on the switch 8 and the switch-over control valve 5. The valve 7 is connected to the control signal organ 1 for switching on the switch 8 via an eighth pipe j and the fifth pipe f. The other side of the on-switching amplification valve 7 is connected to the switch-over control valve 5 via a ninth pipe k. A larger piston end face 5b of a differential piston 5a of the switch-over control valve 5 is selectively subjected to pressure via a tenth pipe 1 which connects the third pipe c and the ninth pipe k. A second restrictive orifice 9 is preferably arranged in the tenth pipe 1.

A smaller piston end face 7c of a differential piston 7a of the on-switching amplification valve 7 is subjectable to the pressure medium via an eleventh pipe m which is connected to the fifth pipe f.

Additionally, a first control signal organ 10 for switching off the switch 8 and a second control signal organ 11 for switching off the switch 8 are provided, with these control signal organs for switching off the switch 8 being in parallel. The first control signal organ 10 for switching off the switch 8 is connected via a pressure release space 10a and a thirteenth pipe o to the sixth pipe g. The second control signal organ 11 for switching off the switch 8 is in fluid communication with the sixth pipe g via a pressure release space 11a and a forteenth pipe p. A twelfth pipe n, a fifteenth pipe q, and a sixteenth pipe r connect a pressurizable space 10b of the first control signal organ 10 for switching off the switch 8 to the fifth pipe f. The twelfth pipe n has a third restrictive orifice 12 arranged therein. A pressurizable space 11b of the second control signal organ 11 for switching off the switch 8 is also connected to the fifth pipe f, via the twelfth pipe n and a seventeenth pipe s.

The sixteenth pipe r also establishes a fluid connection between the pressurizable space 10b of the first control signal organ 10 for switching off the switch 8 and an off-switching amplification valve 13. Further, the sixteenth pipe r establishes a connection between the pressurizable space 10b of the first control signal organ 10 and the pressurizable space 11b of the second control signal organ 11 for switching off the switch 8, said connection being via the fifteenth pipe q and the seventeenth pipe s. On the other side of the off-switching amplification valve 13, an eighteenth pipe t connects the off-switching amplification valve 13 to the ninth pipe k.

In the "off" position (shown in FIG. 1), a moving contact 8a of the hydraulic drive is spaced from fixed contacts 8b of the electrical switch 8. (In order to facilitate an understanding of the present invention, in FIG. 1 and in all subsequent figures the parts which are under pressure at the time are indicated by dotted areas.) Also, in the "off" position, the second pipe b is under pressure from the hydraulic reservoir 3 via the first pipe a and the portion 2a of the drive cylinder 2. The smaller piston end face 5c of differential piston 5a of the switch-over control valve 5 is also under pressure, whereby the differential piston 5a is held in a position in which the third pipe c, the seventh pipe h, the ninth pipe k, the tenth pipe 1, and the eighteenth pipe t are connected to the hydraulic medium container 4 via the switch-over control valve 5 and the fourth pipe d, and thereby each of these pipes is depressurized. Accordingly, the larger piston end face 2a of differential piston 2c of the drive cylinder 2 is not pressurized and hence the piston 2c is pressed into its lower, "off" position (FIG. 1) by the continuously acting pressure on the smaller piston end face 2d.

In the control signal organ 1, the piston end face 1j which faces toward the second end wall 1g of control signal organ 1 for switching on the switch 8 is also relieved of pressure. Also, the central space 7d of the on-switching amplification valve 7 is not pressurized. Further, a pressure relief space 1k of the control signal organ 1 for switching on the switch 8, the pressure relief space 10a of the first control signal organ 10 for switching off the switch 8, and the pressure relief space 11a of the second control signal organ 11 for switching off the switch 8 are continuously connected to the hydraulic medium container 4 via the sixth pipe g and the fourth pipe d, and thereby these spaces are depressurized. Also, the central space 13b of the off-switching amplification valve 13 is depressurized, except during the "switching-off" phase to be described below.

On the other hand, the fifth pipe f (which is connected to the second pipe b) and thereby the central space 1a of the control signal organ 1 for switching on the switch 8 is exposed to the pressure medium, so that the end face 1m of piston 1c (in other words, piston 1c), which end face 1m is on the side of the repelling spring 1d, is held in the rest position (FIG. 1) by the pressure medium (e.g., oil) from the hydraulic reservoir 3. The ball valve 1b is also pressed into the closed position against the first end wall 1f by the pressure in the central space 1a. The ball valve 1b also acts as a differential piston, since the greater-surface area of the ball valve 1b is exposed to the pressure medium from the hydraulic reservoir 3 in the space 1a. At the same time the ball valve 1b is urged toward the closed position and the piston 1c is urged toward the rest position by the repelling spring 1d, so that the action of the pressure meium in the central space 1a assists the action of the repelling spring 1d.

Meanwhile, via the fifth pipe f and the eighth pipe j, the pressure relief space 7e of the on-switching amplification valve 7 and thereby the larger piston end face 7b of the differential piston 7a of the on-switching amplication valve 7 are subjected to the pressure medium. At the same time a repelling spring 7f presses the differential piston 7a in the same direction as the pressure medium in the pressure relief space 7e (FIG. 1), so that the pressure medium acting with the same pressure against the smaller piston end face 7c of the differential piston 7a, via the eleventh pipe m, can definitely not move the differential piston 7a into the open position.

The space 10b of the first control signal organ 10 for switching off the switch 8, which space 10b is pressurizable with the pressure medium, is so pressurized, via the fifth pipe f, the twelfth pipe n, the fifteenth pipe q, and the sixteenth pipe r, whereby the ball valve part 10c of the first organ 10 is held in the closed position. The action of the pressure medium is assisted by a repelling spring 10d which also urges the ball valve part 10c into a ball valve seat.

In addition, the sixteenth pipe r connects pressurizable space 10b to a pressure relief space 13a of the off-switching amplification valve 13, so that a larger piston end face 13d of a differential piston 13c of the off-switching amplification valve 13 is also subjected to the pressure medium and thus the piston 13c is held in the closed position (FIG. 1). Further, the differential piston 13c is also urged into the closed position by a repelling spring 13f.

Figure 2:
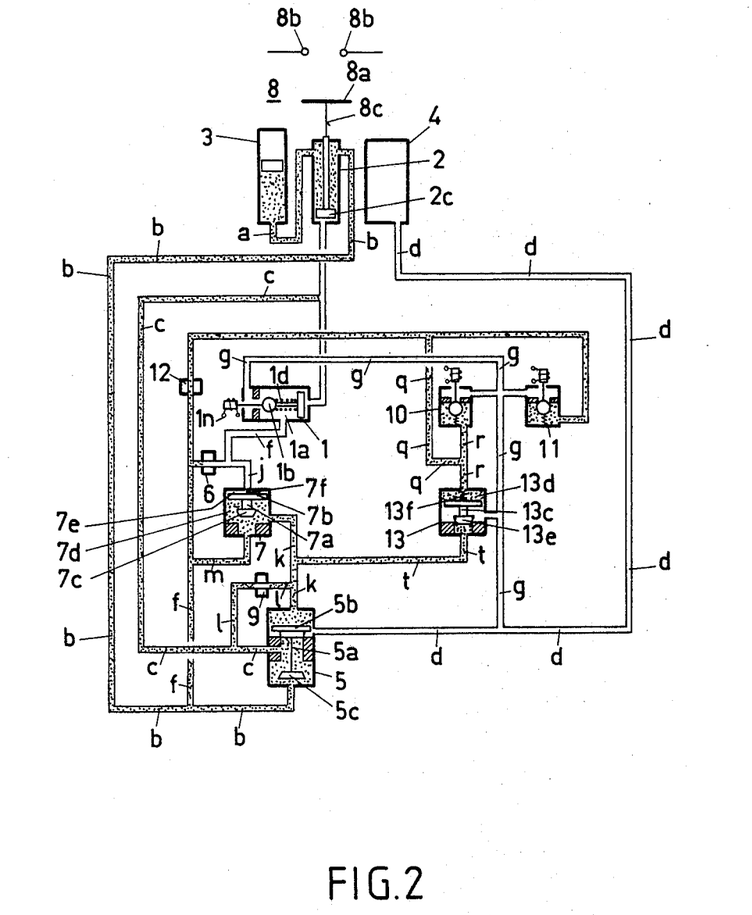
FIG. 2 is a schematic view of a first phase in the on-switching of the system.

With reference to FIG. 2, in a first phase in the on-switching of the electrical switch 8, a coil 1n of the control signal organ 1 for switching on the switch 8 is actuated and the ball valve 1b is moved out of the closed position and into an open position, against the pressure of the pressure medium in the central space 1a and against the action of the repelling spring 1d. In this way, the central space 1a, the fifth pipe f up to the first restrictive orifice 6, the eighth pipe j, and the pressure relief space 7e of the on-switching amplification valve 7 are connected to the hydraulic medium container 4 via the sixth pipe g and the fourth pipe d, and these elements are thus depressurized (indicated in the drawings by the absence of dotted areas in these elements).

Under the influence of the pressure prevailing in the second pipe b, the first pipe f, and the eleventh pipe m, the differential piston 7a of the on-switching amplification valve 7 which is depressurized at the larger piston end face 7b is pushed into an open position by the pressure medium acting on the piston's smaller end face 7c, against the action of the repelling spring 7f. The pressure medium flows from the eleventh pipe m through the central space 7d into the ninth pipe k and the eighteenth pipe t as well as into a segment of the tenth pipe l which extends up to the second restrictive orifice 9.

Meanwhile, the differential piston 13c of the off-switching amplification valve 13 remains in the closed position because the effect of the pressure medium acting over the eighteenth pipe t on the smaller piston end face 13e of the piston 13c is less than the effect of the pressure medium acting over the fifteenth pipe q and the sixteenth pipe r on the larger piston end face 13d. Further, the force of the pressure medium on the larger piston end face 13d is supplemented by the force from the repelling spring 13f.

The larger piston end face 5b of the switch-over control valve 5 is now exposed to the pressure medium via the ninth pipe k. Since the force of the pressure medium on the larger piston end face 5b is greater than the pressure on the smaller piston end face 5c, the differential piston 5a of the switch-over control valve 5 is shifted to a position (shown in FIG. 2) in which the fourth pipe d is closed off, and the pressure medium from the second pipe b via the switch-over control valve 5 subjects at least part of the third pipe c and the tenth pipe l up to the second restrictive 9 orifice to the pressure medium (shown in FIG. 2 by dotted areas).

Figure 3:
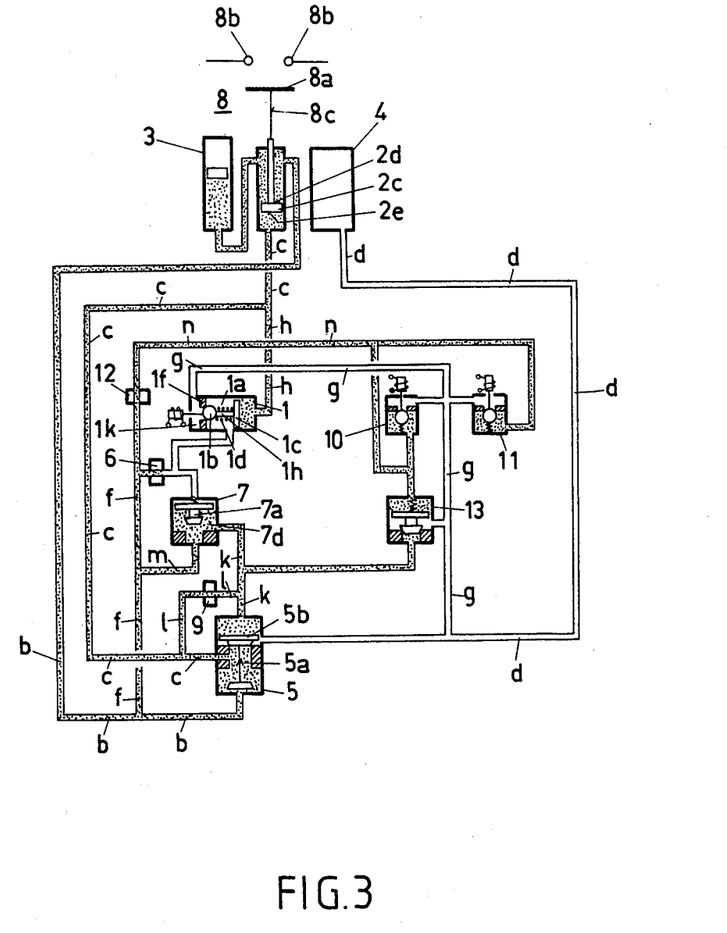
FIG. 3 is a schematic view of a later phase in the on-switching of the system.

With reference to FIG. 3, during a later phase in the on-switching of the electrical switch, the pressure medium has now penetrated through the second restrictive orifice 9, so that the larger piston end face 5b of the differential piston 5a of the switch-over control valve 5 has been pressurized with the pressure medium, via the second pipe b, the switch-over control valve 5, the third pipe c, the tenth pipe l through the second restrictive orifice 9, and the ninth pipe k. In this way, the pressure-medium path which is parallel to this one, namely via the second pipe b, the fifth pipe f, the eleventh pipe m, the central space 7d of the on-switching amplification valve 7, and the ninth pipe k past the differential piston 7a of the on-switching amplification valve 7, can be interrupted without interrupting the action of the pressure medium on the larger piston end face 5b.

Also, the pressure medium which is held behind the first restrictive orifice 6 in the fifth pipe f is beginning to penetrate the orifice 6. Meanwhile, the pressure medium in the third pipe c has exerted pressure on the larger piston end face 2e of the differential piston 2c of the drive cylinder 2, which differential piston was already pressurized on its smaller piston end face 2d. Since the force on the large piston end face 2e is greater, the differential piston 2c of the drive is moved axially upwardly (FIG. 3) along with the movable contact 8a via a switch rod 8c toward the on-switching or closed position. At the same time the piston 1c of control signal organ 1 for switching on switch 8 is subjected to the pressure medium via the third pipe c and the seventh pipe h, and thus the piston 1c moves out of the rest position, against whatever opposing pressure exists in the central space 1a, and against the force of the repelling spring 1d which is located between the piston 1c and the ball valve 1b and acts in the axial direction. Consequently, the ball valve 1b is returned to the closed position by the stem 1h on the piston 1c, and thus the central space 1a is shut off from the pressure relief space 1k of the control signal organ 1 for switching on the switch 8, from the sixth pipe g, the fourth pipe d, and the hydraulic medium container 4.

Figure 4:
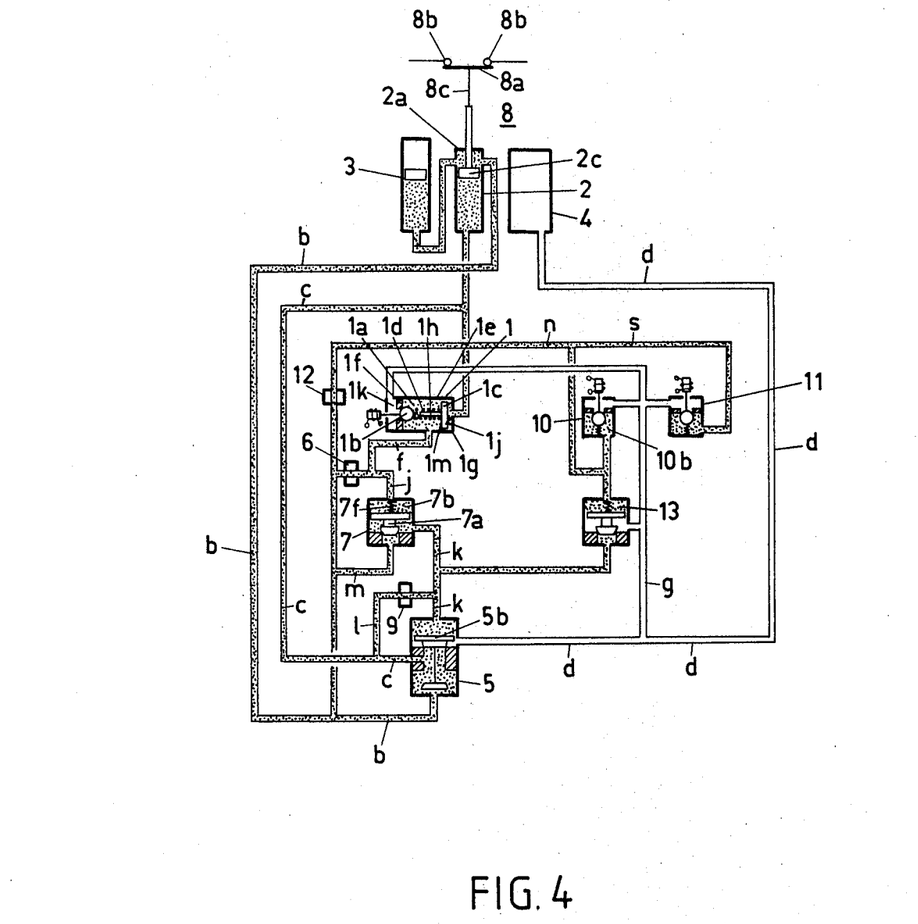
FIG. 4 is a schematic view of an "on" setting of the hydraulic system and the switch.

With reference to FIG. 4, in the "on" position of the hydraulic system and the electrical switch, the differential piston 2c of the drive cylinder 2 has reached its highest or "on" position (FIG. 4) such that the moving contact 8a connects the fixed contacts 8b of the electrical switch 8. In the meantime the pressure prevailing in the hydraulic reservoir 3 and the portion 2a of the drive cylinder 2 has been reestablished in the central space 1a, via the first restrictive orifice 6 and the fifth pipe f. Thus, the end face 1m of the piston 1c of the control signal organ 1 for switching on the switch 8, which end face 1m is on the repelling spring 1d side of the piston 1c, is exposed to the same pressure of the pressure medium as the end face 1j of piston 1c, which end face 1j faces the second end wall 1g. Accordingly, the piston 1c is returned to the rest position (FIG. 4) by the action of the repelling spring 1d, and the stem 1h releases ball valve 1b to permit movement of the ball valve 1b into the ball valve's open position.

However, the ball valve 1b is urged toward the closed position, since it is being pushed by the repelling spring 1d and is also being pressed into the ball valve seat in the first end wall 1f by the pressure medium in the central space 1a. Additionally there is the differential piston effect in this arrangement, since the ball valve surface presented in the axial direction of the cylinder 1e to the pressure medium in the central space 1a is greater than the ball valve surface facing the pressure relief space 1k in addition to the fact that space 1k is ordinarily continuously depressurized.

Meanwhile the larger piston end face 7b of on-switching amplification valve 7 is exposed to the pressure medium, via the first restrictive orifice 6 and the eighth pipe j, and simultaneously the force of the repelling spring 7f so that the the differential piston 7a of the on-switching amplification valve 7 is returned to the closed position against the force of the pressure medium transmitted via the eleventh pipe m. Consequently the fluid communication between the eleventh pipe m and the ninth pipe k is interrupted such that the larger piston end face 5b of the switch-over control valve 5 is subjected to pressure only via the second pipe b, switch-over control valve 5, the third pipe c, the tenth pipe l through the second restrictive orifice 9, and the ninth pipe k.

Figure 5:
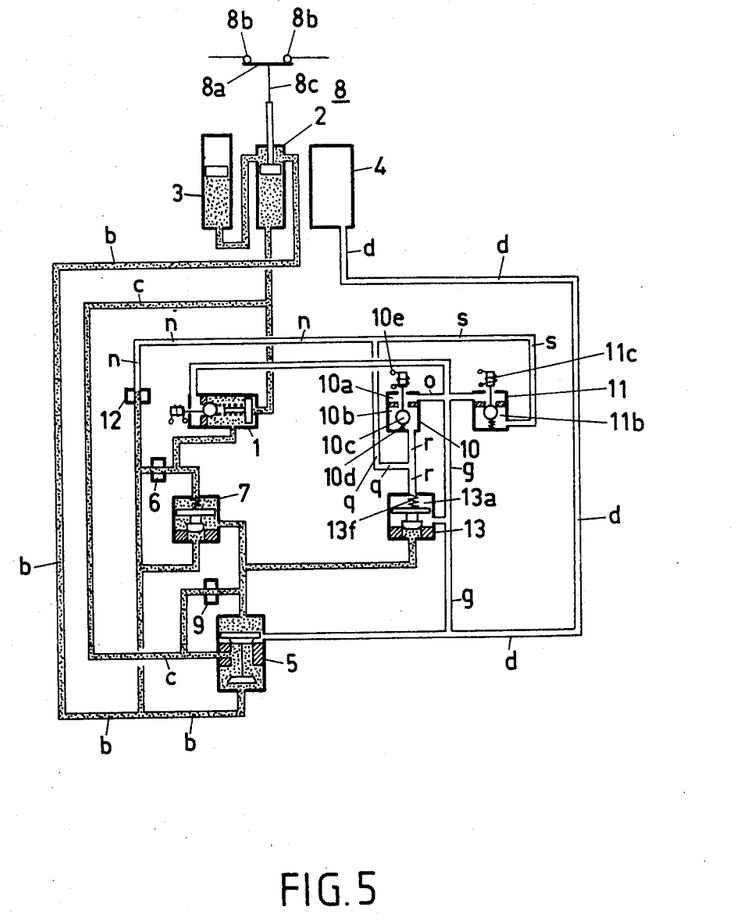
FIG. 5 is a schematic view of the hydraulic system and the electrical switch in a first phase in the off-switching.

With reference to FIG. 5, in an initial phase of the off-switching of the hydraulic system and the switch, either coil 11c of the second control signal organ 11 for switching off the switch 8 or else coil 10e of the first control signal organ 10 for switching off the switch 8 is electrically excited or energized by connecting either coil to a source of electricity. If, for example, the coil 10e is energized the ball valve 10c is pushed into an open position against the prevailing pressure in the pressurized space 10b (FIG. 4) and against the action of the valve spring 10d. In this way, the pressure of the pressure medium is relieved in the sixteenth pipe r, the pressure relief space 13a of the off-switching amplification valve 13, the fifteenth pipe q, the twelfth pipe n up to the third restrictive orifice 12, the seventeenth pipe s, and the pressurized space 11b (FIG. 4) of the second control signal organ 11 for switching off the switch 8, which space 11b is connected to the seventeenth pipe s. This pressure relief occurs via the now-open space 10b and the pressure relief space 10a of the first control signal organ 10 for switching off the switch 8, and continues via the thirteenth pipe o, the sixth pipe g, and the fourth pipe d to the hydraulic medium container 4.

The two control signal organs 10 and 11 for switching off the switch 8 are equivalent in their function. The redundancy in these control signal organs (here double redundancy) is for reasons of reliability, and also to permit the switch 8 to be switched off from different locations, e.g., via an emergency hand-operated switch.

Figure 6:
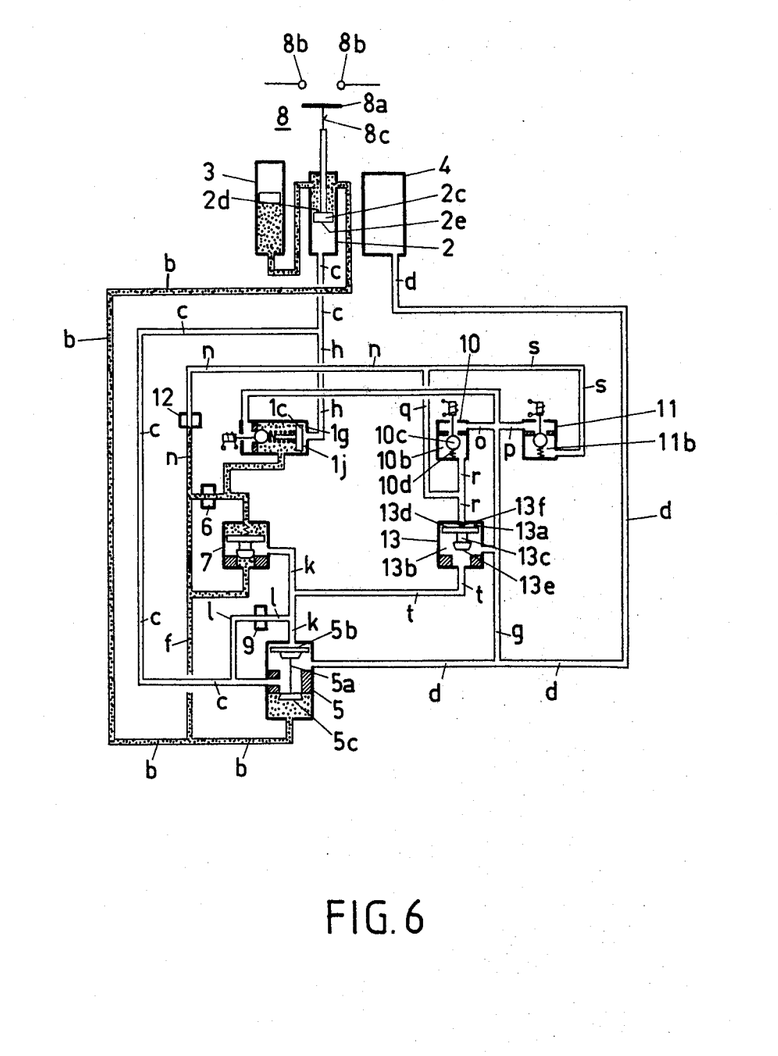
FIG. 6 is a schematic view of a later phase in the off-switching, which is followed by re-establishment of the "off" position of FIG. 1.

With reference to FIG. 6, in a subsequent phase of the off-switching of the electrical switch (The final phase of the off-switching, namely the "off" position, is represented in FIG. 1, discussed supra.), the differential piston 13c of the off-switching amplification valve 13 is urged into the open position (FIG. 6) as a result of the depressurization of the pressure relief space 13a of the off-switching amplification valve 13, and thereby the depressurization of the larger piston end face 13d. The piston 13c is urged by the force of the pressure medium acting on the smaller piston end face 13e (FIG. 5) against the action of the repelling spring 13f. Initially, the eithteenth pipe t, the ninth pipe k, the tenth pipe l up to the second restrictive orifice 9, and the larger piston end face 5b of the switch-over control valve 5 are depressurized, via the central space 13b, the sixth pipe g, and the fourth pipe d. Then, after the initial depressurization, the differential piston 5a of the switch-over control valve 5 is shifted into the closed position (FIG. 6) by the action of the pressure medium on the smaller piston end face 5c. As a result of this shifting, pressure relief occurs in the remainder of the still-pressurized tenth pipe l up to the second restrictive orifice, 9, the third pipe c, and the seventh pipe h. This pressure relief is transmitted via the switch-over control valve 5 and the fourth pipe d and also relieves the pressure on the larger piston end face 2e of the differential piston 2c of the drive cylinder and the end face 1j of piston 1c, which end face faces the second end wall 1g. Consequently the differential piston 2c of the drive cylinder 2 moves to the "off" position by the now-predominant action of the pressure medium on the smaller piston end face 2d. (This "off" position is the position shown in FIG. 1.)

Meanwhile the ball valve 10c of the first control signal organ 10 for switching off the switch 8 has been urged into the closed position by the valve repelling spring 10d. Further, the differential piston 13c of the off-switching amplification valve 13 has also been moved into the closed position by the repelling spring 13f, so that the pressure of the pressure medium may reestablish itself in the twelfth pipe n from the third restrictive orifice 12, in the fifteenth pipe q, in the sixteenth pipe r, in the space 10b of the first control signal organ 10 for switching off the switch 8, which space 10b is pressurizable and is connected to the sixteenth pipe r, and in the pressure relief space 13a of the off-switching amplification valve 13, as well as in the seventeenth pipe s and the pressurizable space 11b of the second control signal organ 11 for switching off the switch 8. (These reestablished pressures are shown in FIG. 1).

Figure 7:
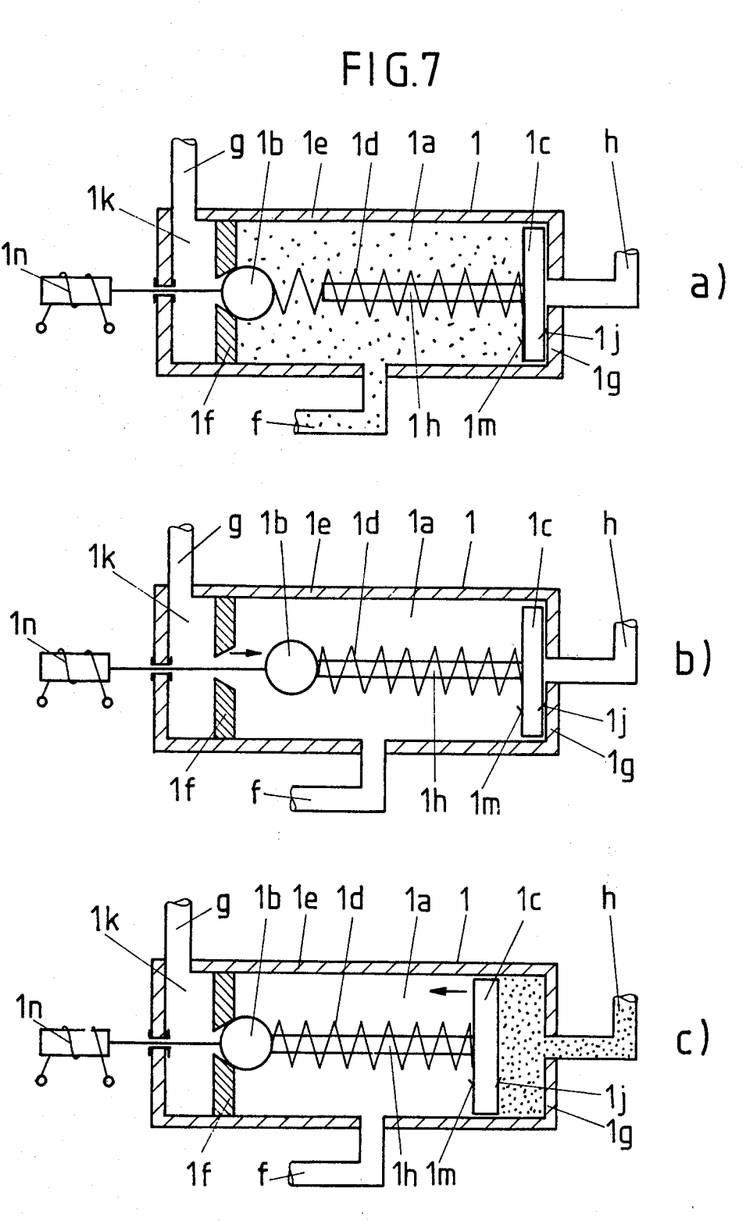
FIG. 7a is an enlarged sectional view of a control signal organ for switching on the switch with the organ in an untriggered or rest position.
FIG. 7b is an enlarged sectional view of the control signal organ for switching on the switch with the organ in a triggered position for switching on the switch.
FIG. 7c is an enlarged sectional view of the control signal organ for switching on the switch in a first phase of the hydraulic resetting of the switch's electrically actuated "on" position.

With reference to FIG. 7a, the control signal organ 1 for switching on the switch 8 has the space 1a filled with the pressure medium (as in FIGS. 1 and 6). A portion of the space 1a which extends between the ball valve 1b and the free end of the stem 1h is sufficiently large so that after the electrical actuation circuit 1n is triggered, the ball valve 1b may be pushed into the open position (FIG. 7b and also FIG. 2) against the action of the repelling spring 1d to relieve the pressure in the central space 1a whereby the on-switching process of the electrical switch 8 is initiated.

With reference to FIG. 7c, the resetting phase of the ball valve 1b of the control signal organ 1 for switching on the switch 8 is accomplished by the stem 1h attached to the piston 1c which is exposed to the pressure medium via the seventh pipe h with the stem 1h and the piston 1c acting as the first resetting means, and at the same time by the repelling spring 1d, acting as the second resetting means which spring 1d is compressed. (FIG. 3 illustrates the same resetting phase of the ball valve 1b that is illustrated in FIG. 7c.)

With reference to FIGS. 3 and 7c, the ball valve 1b is restored to the closed position by the hydraulic action of the pressure medium, which medium is also simultaneously transmitting pressure to the differential piston 2c of the drive cylinder 2 which is in the "on" position. During this process, the repelling spring 1d acts in concert with the pressure medium to reset the ball valve 1b. Also, the repelling spring 1d resets the piston 1c into the rest position following the reestablishment of the pressure of the pressure medium in the central space 1a, i.e., after the resetting of the ball valve 1b (FIG. 4).

As has been previously described, the first restrictive orifice 6 produces a pressure drop in the pressure medium flowing from the hydraulic reservoir 3 as long as the on-switching control signal is maintained. The restrictive orifice 6 enables depressurizing of the on-switching amplification valve 7 at the larger piston end face 7b, and thereby the opening of the on-switching amplification valve 7. Also, the first restrictive orifice 6 aids in producing automatic holding of the on-switching amplification valve 7 in the closed position during the off-switching process of the switch 8. Further, slow pressure decrease due to internal leakage past the larger piston end face 7b of the on-switching amplification valve 7 is prevented.

The third restrictive orifice 12 has an analogous effect with regard to the off-switching amplification valve 13. The second restrictive orifice 9 brings about the automatic holding of the switch-over control valve 5 in the down position during the "on" switching process of the switch 8. Further, slow pressure decrease due to internal leakage past the larger piston end face 5b of the switch-over control valve 5 is prevented.

The drive cylinder 2, the amplification valves 7 and 13, and the switch-over control valve 5 operate according to the differential piston principle. The pistons in the drive cylinder 2 and in these other valves each have multiple piston end faces of different size. The smaller piston end face may be continuously exposed to the pressure medium. The switching of each of the valves occurs by pressurizing or depressurizing the larger piston end face. Also, in each case the repelling spring serves to aid in resetting the valve into the closed position.

The inventive drive obviously is not limited to hydraulic systems using oil i.e., a liquid as the pressure medium but may similarly be used in pneumatic systems, e.g. employing air as the pressure medium.

The principles and preferred embodiment of the present invention have been described in the foregoing specification. However, the invention which is intended to be protected is not to be construed as limited to the particular embodiment disclosed. The embodiment is to be regarded as illustrative rather than restrictive. Variations and changes may be made by others without departing from the spirit of the present invention. Accordingly, it is expressly intended that all such variations and changes which fall within the spirit and scope of the present invention as defined in the appended claims be embraced thereby.

What is claimed is:

1. A hydraulic drive for electrical switches comprising:

a drive cylinder;

a drive piston dividing the drive cylinder into first and second chambers and being connected to an electric switch, said drive piston being arranged for reciprocation within the drive cylinder for opening and closing the electric switch and having first and second end faces having different effective areas;

a smaller end face of the piston being arranged in the first chamber and being constantly exposed to a pressure medium pressurized in a hydraulic reservoir and connected to the first chamber of the cylinder by a first pipe;

a switch-over control valve for actuating movement of the drive piston for opening or closing the switch is connected to the first chamber of the drive cylinder by a second pipe, said switch-over control valve having a first position for closing the switch by selectively exposing a larger end face of the piston arranged in the second chamber to the pressure medium through a third pipe and having a second position for opening the switch by selectively relieving the pressure medium on the larger end face by a fourth pipe connected between the switch-over control valve and a hydraulic medium container;

a control signal organ for initiating movement of the switch-over control valve toward the first position for closing the switch including a central space exposed to the pressure medium through the second pipe, a fifth pipe and a first restrictive orifice, the central space being selectively connected to the hydraulic medium container to relieve the pressure within the space through a sixth pipe and the fourth pipe by movement of a switchable control signal organ part to open position, the central space being selectively isolated from the container when said organ part is in a closed position, and first resetting means for hydraulically resetting the control signal organ part to the closed position, said first resetting means being exposed to pressure medium at approximately the same time as the larger end face of the drive piston is exposed to the pressure medium through the switch-over control valve, the third pipe and a seventh pipe.

2. The hydraulic drive according to claim 1, further comprising second resetting means for mechanically returning the first resetting means to a rest position, the second resetting means being arranged between the control signal organ part and the first resetting means.

3. The hydraulic drive according to claim 1 or 2, wherein the central space is bounded by a cylinder and wherein the first resetting means comprises a piston guided for reciprocating movement in an axial direction of the cylinder and sealed against passage of the pressure medium around the piston.

4. The hydraulic drive according to claim 1, wherein the central space is bounded by a cylinder having an orifice in a first end wall which orifice is openable and closable by the control signal organ part which comprises a ball valve, said ball valve being disposed in the central space, a second end of the cylinder being partially closed off by a second end wall to which the seventh pipe is connected.

5. The hydraulic drive according to claim 4, wherein the first resetting means comprises a piston guided for reciprocating movement in an axial direction of the cylinder, and further comprising second resetting means for mechanically returning the piston to a rest position comprising a repelling spring mounted between the ball valve and the piston, the fifth pipe being connected to the central space between the ball valve and the piston.

6. The hydraulic drive according to claim 5, wherein the movable piston includes a stem acting as a push rod for the hydraulic resetting of the ball valve.

7. The hydraulic drive according to claim 1, wherein the connection between the second chamber of the drive cylinder and the control signal organ, which connection is comprised of a portion of the third pipe along with the seventh pipe, is arranged to be as short as possible.

8. The hydraulic drive according to claim 6, wherein the stem is cylindrically shaped and acts as a guide element for the repelling spring.

9. The hydraulic drive according to claim 1, further comprising an amplification valve inserted between the control signal organ for initiating movement of the drive piston for closing the switch and the switch-over control valve, said amplification valve being connected on one side to the control signal organ through an eighth pipe and the fifth pipe, and said amplification valve being connected on the other side to the switch-over control valve through a ninth pipe.

10. The hydraulic drive according to claim 1, wherein the central space is bounded by a cylinder, the first resetting means comprises a piston arranged near a first end of the cylinder and guided for reciprocating movement in an axial direction of the cylinder and sealed against passage of the pressure medium around the piston, and the control signal organ part comprises a ball valve arranged within the central space and adapted to open and close an orifice in a second end wall of the cylinder.

11. The hydraulic drive according to claim 1, further comprising at least one control signal organ for initiating movement of the switch-over control valve to the second position for opening the switch.

* * * * *